Dec. 25, 1934.  W. C. STARKEY  1,985,387
SPRING CLUTCH
Filed Sept. 9, 1929
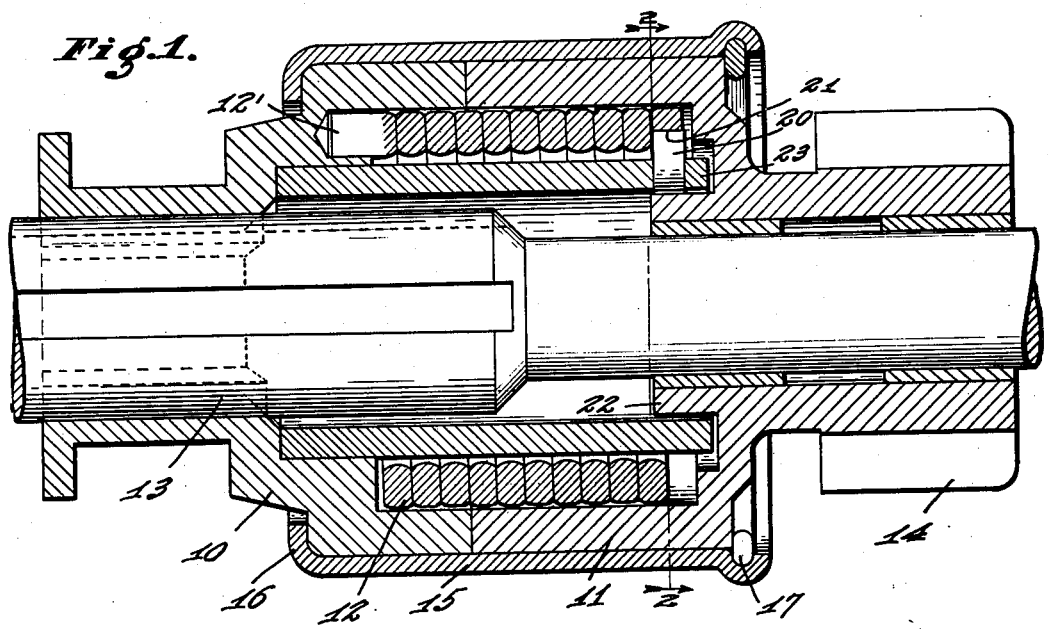
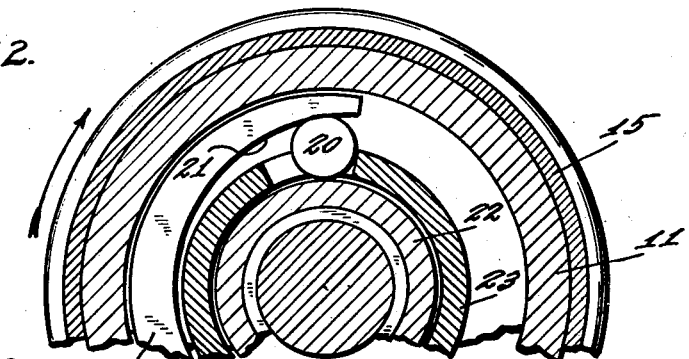
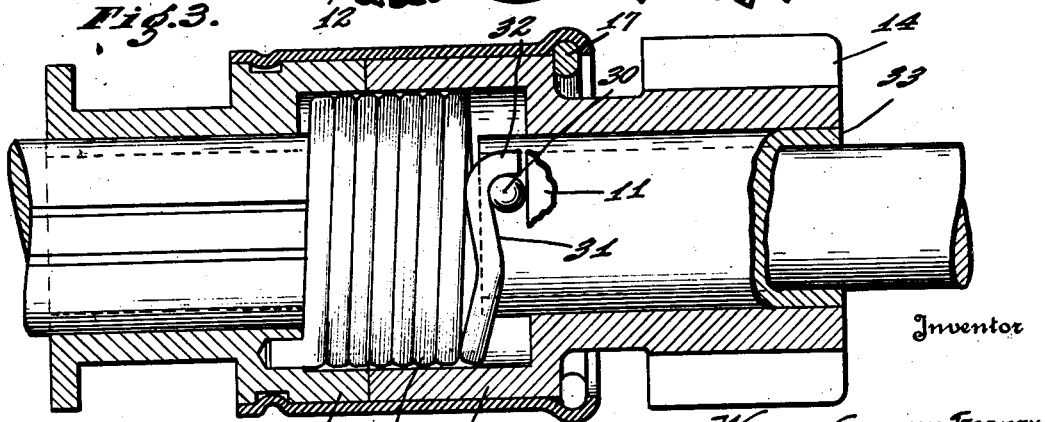
Inventor
WILLIAM CARLETON STARKEY,
By
Attorney Patented Dec. 25, 1934

1,985,387

UNITED STATES PATENT OFFICE 1,985,387

SPRING CLUTCH

William Carleton Starkey, Indianapolis, Ind., assignor to L. G. S. Devices Corporation, Indianapolis, Ind., a corporation of Indiana Application September 9, 1929, Serial No. 391,272

11 Claims. (Cl. 192—41)

My invention is concerned with overrunning clutches of the type embodying two co-axial cup-shaped members within which there is disposed a helical spring adapted to permit comparatively free relative rotation of the two clutch members in one direction but to expand into gripping engagement with the interior surfaces of such members when they tend to rotate relatively in the other direction.

In order to obtain the most satisfactory operation for such a clutch, it is necessary to ensure that the helical spring acts throughout its entire length and that all spring turns are forced outwardly when relative rotation of the two clutch members is in such a direction as to unwind or expand the spring. For this reason, it has frequently been found advantageous to arrange the spring in such a manner that its extreme end turn will bear against its adjacent clutch member with somewhat greater force than will other spring-turns. Another expedient which has been used is to employ a friction-brake member which is connected positively to the end spring-turn and which is adjustable to provide a frictional drag upon the adjacent clutch member.

Whatever provision has been made for ensuring that the end spring-turn will expand and cause all other turns to expand, there is always present a certain amount of frictional drag which opposes a free overrunning action and which, on account of attendant wear, becomes less and less effective to accomplish its primary object as the clutch is used. Further, it has always been the practice in a simple overrunning clutch to make the spring somewhat larger than the recesses which receive it; and when this is done, all the spring turns exert a frictional drag opposing overrunning.

One object of the present invention is to provide a coil-spring clutch which is generally an improvement upon, and is more efficient and positive in operation than, previously designed clutches of the same general character by reason of the fact that it embodies simple and novel means which ensures clutching action of the end spring-turn, without unduly opposing free overrunning action.

Another object of the invention is to provide an overrunning clutch of the type under consideration which consists of but a small number of parts and may be manufactured at a low and reasonable cost.

Other objects of the invention and the various advantages and characteristics of the present clutch construction will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views: Fig. 1 is a longitudinal section through a device embodying the invention; Fig. 2 is a fragmental section taken on the line 2—2 of Fig. 1; and Fig. 3 is a longitudinal section through a device embodying a modified form of the invention.

The clutch which forms the subject matter of the invention is adapted primarily for use in connection with a starter drive for an internal combustion engine although it has many other applications.

As shown in the drawing the clutch comprises a pair of co-axial cup-shaped clutch members 10 and 11 within which is located a helical clutch spring 12. One of the clutch members, here shown as the clutch member 10, is splined to a driving shaft 13, and the other clutch member is operatively connected to, as by being integral with, a driven member in the form of a pinion 14. The two clutch members are prevented from moving axially relative to each other by means of a surrounding tubular casing 15 one end of which is turned inward to form a flange 16 overlying a shoulder on the clutch member 10 and the other end of which is provided in its inner surface with an annular groove adapted to receive a split spring ring 17 which bears against a shoulder on the clutch member 11.

The clutch spring 12 is connected to one of the clutch members for rotation therewith. As shown in the drawing, the connection is provided by bending axially outward the extreme end 12′ of the spring 12 and by inserting such extreme end in a hole in the inner end of the recess in the clutch member 10.

The outer diameter of the spring is less than the diameter of the recess in the clutch member 11; so that in the absence of some special provision for expanding the spring the two clutch members could rotate freely relative to each other in either direction. As the clutch is designed to be an over-running clutch and therefore must effect a driving connection between the two clutch members when they tend to rotate relatively in one direction, there is provided between the clutch member 11 and the adjacent end of the spring-turn an interconnecting means which serves to interconnect the end spring-turn and the clutch member when the two clutch members tend to rotate in a direction which would cause the spring to unwind or expand.

In the embodiment of the invention illustrated in Figs. 1 and 2, this interconnecting means comprises a roller 20 which lies between the inner surface 21 of the end spring-turn and the outer surface of an annular flange 22 on the clutch member 11. The inner surface 21 of the end spring-turn is made of a spiral conformation of gradually increasing radius toward its extreme end, as is clear from Fig. 2. To retain the roller 20 in place, it may be located in a slot in a sleeve 23 which is rotatable with the clutch member 10.

In Fig. 2, the spring is shown under conditions obtaining when the clutch is at rest, the spring being unstressed and out of engagement with the wall of the recess in the clutch member 11. Should the driving clutch member 10 rotate in the clockwise direction indicated by the arrow in Fig. 2, the spring 12 will rotate with it, and the roller 20 will exert a wedging action on the radially inclined surface 21 of the end spring-turn and will force such end spring-turn outwardly into engagement with the wall of the recess in the member 11. This provides an interconnection between the end spring-turn and the clutch member 11, and causes the spring to unwind and to expand into gripping engagement with the walls of its associated recess to produce an operative interconnection between the two clutch members. This condition obtains so long as the clutch member 11 is driven from the clutch member 10.

When overrunning occurs, however—i. e., when the clutch member 11 rotates in a clockwise direction at a more rapid rate than does the clutch member 10—the roller 20, by reason of its engagement with the flange 22 is carried toward the extreme end of the spring. This permits the end spring-turn to contract out of engagement with the wall of the recess in the clutch member 11 and breaks the operative connection between the end spring-turn and the clutch member 11. This connection being broken, the inherent elasticity of the spring causes all spring-turns to contract, and the clutch member 11 overruns freely. The only resistance to overrunning is the very slight friction between the flange 22 and the roller 20, which are held lightly in contact with each other by the end spring turn.

In the embodiment of the invention illustrated in Fig. 3, the interconnection between the end spring-turn and the clutch member 11 is provided by a ball 30 which lies between the end spring-turn and the bottom of the recess in the clutch member 11. To co-operate properly with the ball 30, the end spring-turn is bent to provide an inclined surface 31 which recedes from the bottom of the recess in the clutch member 11 toward the end of the spring. The extreme end of the spring may be bent toward the bottom of the recess, as indicated at 32 to retain the ball in place. The ball rests upon an annular flange which is conveniently provided by the projecting end of a bushing 33 that is rotatable with the clutch member 11.

The clutch of Fig. 3 operates in a manner analogous to that of Figs. 1 and 2 except that the ball 30 exerts an axial pressure between the end spring-turn and the clutch member 11, whereas the roller 20 exerted a radial pressure on these two parts. When the device is not operative, and when overrunning is occurring, the ball lies against the bent end 32 of the spring as shown in Fig. 3, the end spring-turn preferably exerting a light pressure holding the ball in contact with the bottom of the recess in the clutch member 11. When the two clutch members tend to rotate in the direction to unwind the spring, the ball 30 exerts a wedging action on the inclined surface 31 and connects the end spring-turn to the clutch member 11. The interconnection which is thus provided between the end spring-turn and the clutch member 11 results in an expansion of the spring into gripping engagement with the walls of its associated recess, thus clutching the two clutch members 10 and 11 together. When the clutch member 11 overruns, the ball 30 is moved toward the bent end 32 of the spring to relieve the axial pressure on the end spring-turn and to disconnect such end spring-turn from the clutch member 11. Thereupon, the spring is collapsed by its inherent elasticity, and the clutch member 11 overruns freely.

I claim as my invention:

1. An overrunning clutch comprising two co-axial, relatively rotatable, complemental clutch members, one of said members being provided with an axial circular recess, a coil spring disposed in said recess and having one end thereof operatively connected to the other of said members so as to rotate therewith, said spring having a normal diameter less than that of the recess and being normally free from operative connection with the recessed clutch member, and means operable in response to relative rotation of the two clutch members in the direction tending to unwind the spring for exerting a wedging action in a radial direction on the other end of the spring in order operatively to connect said other end of the spring and the recessed clutch member.

2. An overrunning clutch comprising two relatively rotatable co-axial members, one of said members being provided with an axial circular recess, a coil spring located in said recess and operatively connected to the other of said members, said spring having a diameter less than that of the associated recess and being normally free from operative connection with said recessed member, said recessed member and the end turn of said spring being provided with adjacent surfaces inclined relatively to each other and a circular part located between said inclined surfaces and adapted to exert a wedging action upon them to connect operatively said recessed member and the adjacent end of the spring when the two members tend to rotate relatively in a direction to expand said spring.

3. An overrunning clutch comprising two relatively rotatable co-axial members, one of said members being provided with an axial circular recess, a coil spring located in said recess and operatively connected to the other of said members, said spring having a diameter less than that of the associated recess and being normally free from operative connection with said recessed member, said recessed member and the end turn of said spring being provided with adjacent surfaces inclined relatively to each other, a circular part located between said inclined surfaces and adapted to exert a wedging action upon them to connect operatively said recessed member and the adjacent end of the spring when the two members tend to rotate relatively in a direction to expand said spring, and means rotatable with said spring for limiting movement of said circular part.

4. An overrunning clutch comprising two relatively rotatable co-axial members, one of said members being provided with an axial circular recess, a coil spring located in said recess and operatively connected to the other of said members, said spring having a diameter less than that of the associated recess and being normally free from operative connection with said recessed member, said recessed member and the end turn of said spring being provided with adjacent surfaces inclined relatively to each other, a circular part located between said inclined surfaces and adapted to exert a wedging action upon them to connect operatively said recessed member and the adjacent end of the spring when the two members tend to rotate relatively in a direction to expand said spring, and means for limiting movement of said circular part.

5. An overrunning clutch comprising two relatively rotatable co-axial members, one of said members being provided with an axial circular recess, a coil spring located in said recess and operatively connected to the other of said members, and means exerting a rolling wedging action on the end turn of said spring for operatively connecting said recessed member to the adjacent end of said spring when the two members tend to rotate relatively in a direction to unwind said spring.

6. An overrunning clutch comprising two relatively rotatable co-axial members, one of said members being provided with an axial circular recess, a coil spring located in said recess and operatively connected to the other of said members, said recessed member and the end turn of said spring being provided with adjacent surfaces inclined relatively to each other, and a circular part located between said inclined surfaces and adapted to exert a wedging action upon them to connect operatively said recessed member and the adjacent end of the spring when the two members tend to rotate relatively in a direction to expand said spring.

7. In an overrunning clutch of the character described, the combination of two relatively rotatable members, a coil spring having one end turn normally free from connection with one of said members whereby said two members may normally rotate relatively to one another in either direction, said members having surfaces arranged to be gripped by said coil spring upon a change in its diameter, and means exerting a rolling wedging action on said end turn of the spring for operatively connecting the same to one of said members when said members rotate relatively to one another in one direction.

8. In an overrunning clutch of the character described, the combination of two relatively rotatable axial members coacting to provide a clutch spring recess having an internal clutch surface, a coil spring in said recess and having one end turn normally free from connection with one of said members whereby said two members may normally rotate relatively to one another in either direction, and means actuated in response to relative rotation of said members in one direction and operating with a rolling wedging action upon said end turn of the spring operatively to expand and engage the same, against said internal clutch surface.

9. In an overrunning clutch of the character described, the combination of two relatively rotatable members, a coil spring having one end turn normally free from connection with one of said members whereby said two members may normally rotate relatively to one another in either direction, said members having surfaces arranged to be gripped by said coil spring upon a change in its diameter, and a rolling element extending between and engaging said end turn of the spring and an adjacent part of said one member and acting with a rolling wedging action in response to relative rotation of said members in one direction for connecting said end turn to said one member.

10. An overrunning clutch comprising two relatively rotatable members coacting to provide a clutch spring receiving recess, a clutch spring located in said recess, means operatively connecting one end turn of said spring to one of said members, the other of said members having a surface adapted to be engaged by said spring upon a change in its diameter in one direction, and means operating in response to relative rotation of said members in one direction for exerting a rolling wedging action upon the other end turn of the spring for operatively engaging the same with said surface.

11. An overrunning clutch comprising two relatively rotatable members coacting to provide an annular recess having an internal surface, a clutch spring in said recess having a normal clearance with respect to said surface, means operatively connecting one end turn of the spring to one of said members, and means operating in response to relative rotation of said members in one direction for exerting a rolling wedging action on the other end turn of the spring for radially expanding the same into operative engagement with said internal surface.

WILLIAM CARLETON STARKEY.